United States Patent [19]

Koyano et al.

[11] Patent Number: 5,330,554
[45] Date of Patent: Jul. 19, 1994

[54] METHOD FOR PRODUCING IRON-NITRIDE POWDERS

[75] Inventors: Tamotsu Koyano; Uichiro Mizutani, both of Nagoya, Japan

[73] Assignee: Aisin Seiki Kabushiki Kaisha, Kariya, Japan

[21] Appl. No.: 936,280

[22] Filed: Aug. 28, 1992

[30] Foreign Application Priority Data

Aug. 30, 1991 [JP] Japan .................................. 3-219988
Mar. 31, 1992 [JP] Japan .................................. 4-77748

[51] Int. Cl.$^5$ .............................................. B22F 9/04
[52] U.S. Cl. .......................................... 75/348; 75/352; 75/354; 423/409; 264/82
[58] Field of Search ......................... 75/348, 352, 354; 423/409; 264/82, 140

[56] References Cited

U.S. PATENT DOCUMENTS

| 2,872,292 | 2/1959 | Altmann | 423/409 |
| 3,700,499 | 10/1972 | Haack et al. | 423/409 |
| 4,787,561 | 11/1988 | Kemp et al. | 75/354 |

OTHER PUBLICATIONS

J. Appl. Phys., vol. 67, No. 9, May 1, 1990, M. Komuro, et al., "Epitaxial Growth and Magnetic Properties of Fe$_{16}$N$_2$ Films with High Saturation Magnetic Flux Density (Invited)", pp. 5126–5131.

Appl. Phys. Lett., vol. 20, No. 12, Jun. 15, 1972, T. K. Kim, et al., "New Magnetic Material Having Ultrahigh Magnetic Moment", pp. 492–494.

Primary Examiner—George Wyszomierski
Attorney, Agent, or Firm—Oblon, Spivak, McClelland, Maier & Neustadt

[57] ABSTRACT

A method for producing iron-nitride powder comprises the steps of introducing iron powder and NH$_3$ gas or N$_2$ gas in a vessel, and milling the iron powder in the NH$_3$ gas or the N$_2$ gas. Furthermore, a method for producing iron-nitride powder comprises the steps of introducing iron powder and intermetallic compound powder of iron and nitrogen in a vessel, and milling the iron powder and the intermetallic compound powder. The obtained iron-nitride powder consists essentially 85.1 to 99 at % of iron and the rest of nitrogen, and has a body centered cubic structure.

7 Claims, 11 Drawing Sheets

METHOD FOR PRODUCING IRON-NITRIDE POWDERS

BACKGROUND OF THE INVENTION

1. Field of the Invention

The present invention relates to a method for producing iron-nitride powders in which nitrogen atoms are dissolved into α-iron. The resulting iron-nitride powders will be used as an excellent magnetic substance.

2. Description of the Related Art

A metastable intermetallic compound, $Fe_{16}N_2$, comprising 16 iron atoms and 2 nitrogen atoms has a unit cell possessing body centered tetragonal (described as bct) crystal structure and exhibits excellent magnetic characteristics. This intermetallic compound is produced by vapor deposition of Fe in a reduced $N_2$ gas atmosphere. (See J. Appl. phys., 67 (1990) 5126, Appl. phys. Lett., 20 (1972) 492))

Inventors have paid attention to the magnetic characteristics of the intermetallic compound and tried to develop a method for easily producing Fe-N alloy having the same magnetic characteristics as that of the intermetallic compound.

As for a compound comprising iron and nitrogen, $Fe_4N$ has been known. The compound has γ'-phase and is obtained by annealing α-Fe at temperatures between 500° C. and 600° C. in a nitrogen gas or $NH_3$ gas atmosphere. Nitrogen atoms hardly dissolve into α-Fe at room temperature as described in the Fe-N binary phase diagram shown in FIG. 16. So, iron-nitride having body centered cubic crystal structure cannot be produced by the annealing.

SUMMARY OF THE INVENTION

It is an object of the present invention to provide a method for producing iron-nitride powder at room temperature by making use of mechanochemical reaction, thereby obtaining a substance which has excellent magnetic characteristics.

It is another object of the present invention to produce iron-nitride powders with body centered cubic (hereinafter described as bcc) crystal structure.

Further object of the present invention is to produce: easily the iron-nitride powder with bcc crystal structure.

The present inventors expected that they could obtain the substance having excellent magnetic characteristics due to the reaction in which nitrogen atoms are dissolved into α-Fe. They happened to think of making use of mechanochemical reaction, and succeeded in nitrizing α-Fe at almost room temperature under the condition of α-Fe.

The inventors tried to react α-Fe powder and ammonia gas (hereinafter described as $NH_3$ gas) filled in a ball mill vessel by means of ball milling. In this method, nitrogen atoms in $NH_3$ molecules was absorbed into α-Fe powder, and iron-nitride powder having bcc crystal structure and hydrogen gas were produced. This reaction may be represented as the following formula:

$$2Fe + NH_3 \rightarrow 2(Fe_x\text{-}N) + 3H_2$$

Then, the inventors tried to react α-Fe powder and γ'-$Fe_4N$ powder by means of ball milling. In this solid state reaction, γ'-$Fe_4N$ having face centered cubic (hereinafter described as fcc) structure disappeared and iron-nitride powder with bcc structure was produced.

This reaction may be represented as the following formula:

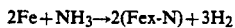

$$Fe + Fe_4N \rightarrow Fe_x\text{-}N$$

In the above two cases (i.e. in case of using $NH_3$ gas and in case of using γ'-$Fe_4N$), iron-nitride powder with bcc crystal structure has been obtained. Regarding the X-ray diffraction spectra for the obtained substances, as peaks of α-Fe were broaded, the peaks shifted to a low angle side. When γ'-$Fe_4N$ powder having fcc structure was used, ;the intensity of diffraction peaks of γ'-$Fe_4N$ decreased and finally disappeared as the reaction progressed. So, the obtained substance would have bcc structure.

Coercive force of the obtained $Fe_x$-N is superior to that of α-Fe.

Based on the above-mentioned results, the inventors have perfected the inventions for producing iron-nitride powders.

A method for producing iron-nitride powders according to the present invention comprises the steps of:

introducing iron powder and $NH_3$ gas or $N_2$ gas in a vessel; and milling the iron powder in the $NH_3$ gas or the $N_2$ gas.

Another method for producing iron-nitride powders according to the present invention comprises the steps of:

introducing iron powder and intermetallic compound powder iron and nitrogen in a vessel; and milling the iron powder and the intermetallic compound powder.

the mechanochemical reaction, the magnetic characteristics of the obtained $Fe_x$-N was deteriorated by oxygen and carbon. So, it is necessary to control the contamination of oxygen and carbon.

As for reacting material, $NH_3$ gas is substituted by reducing nitrogen gas such as the mixed gas consisting of nitrogen gas and hydrogen gas, and $Fe_4N$ is substituted by other intermetallic compound such as $Fe_2N$.

The mechanochemical reaction of α-Fe and $Fe_4N$ or $Fe_2N$ can be carried out in an atmosphere of an inert gas, $NH_3$ gas or the mixed gas consisting of $N_2$ and $H_2$.

The reacting temperature must be low in order that bcc-($Fe_x$-N) may not be decomposed into α-Fe and $Fe_4N$. The desirable reacting temperature is lower than 160° C.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

The Preferred Embodiments according to the present invention will be hereinafter described with reference to FIGS. 1 through 16.

First Preferred Embodiment

In the First Preferred Embodiment, a planetary type ball mill (Flitsch P-5) was used. Twenty balls made of bearing steel having a diameter of 10 mm and twenty grams of iron powder (smaller than 200 mesh, 99%) were filled within the ball mill vessel (content volume being 80 cc) made of die steel. Then, ammonia gas at a pressure of 1.5 atoms was supplied into the vessel.

The ball mill vessel was rotated at 440 rpm. This treatment intended to cause the reaction described as the following formula:

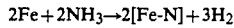

$$2Fe + 2NH_3 \rightarrow 2[Fe-N] + 3H_2$$

Iron-nitride powder would be produced by this reaction.

It took 50 hours to react a whole amount of ammonia gas in the vessel with iron powders on condition that the rotation speed is 440 rpm.

Figure 1:
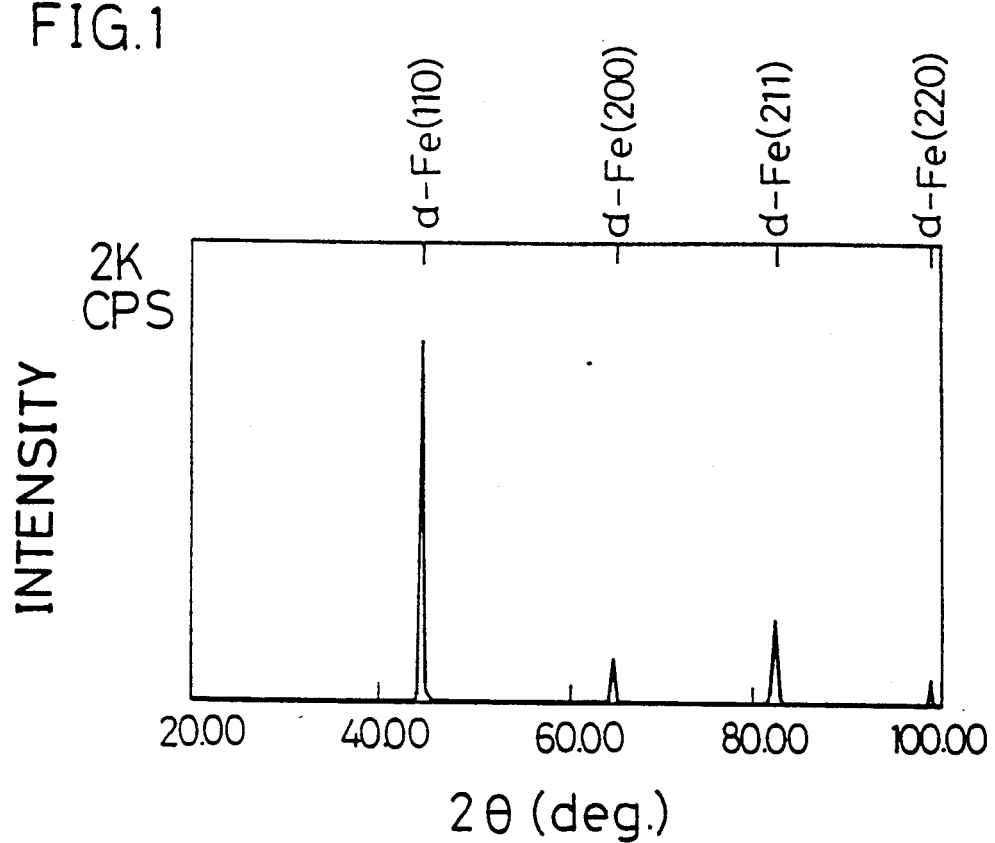
FIG. 1 is a X-ray diffraction pattern for pure iron (α-Fe).
Figure 9:
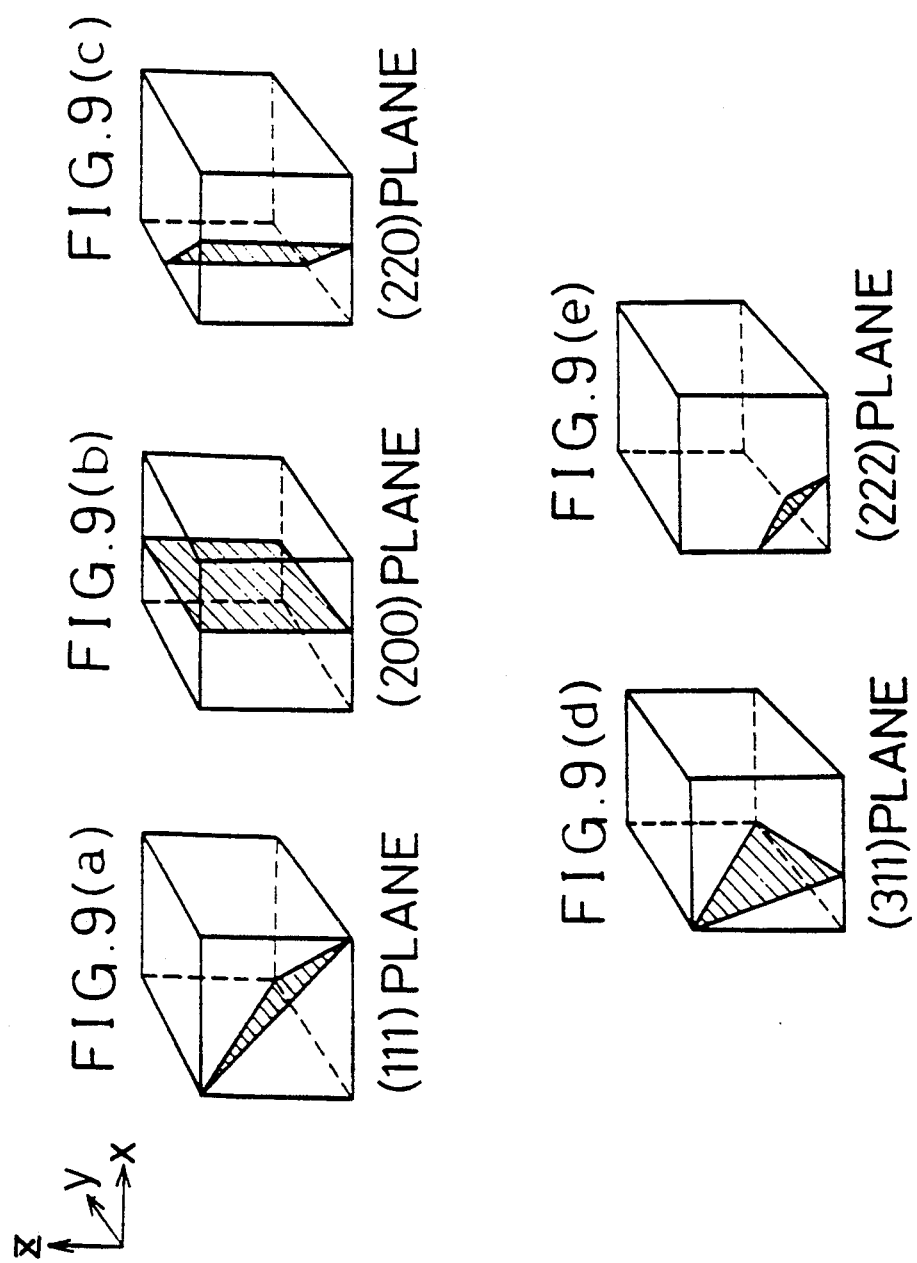
FIG. 9 shows some of crystallographic planes of $\gamma'$-Fe$_4$N.

FIG. 1 shows X-ray diffraction pattern of pure iron ($\alpha$-Fe) powder which is not reacted with nitrogen. In FIG. 1, $2\theta$ is twice an incident angle $\theta$ as described in FIG. 8. FIG. 9 illustrates the crystallographic planes for cubic unit cells.

Figure 2:
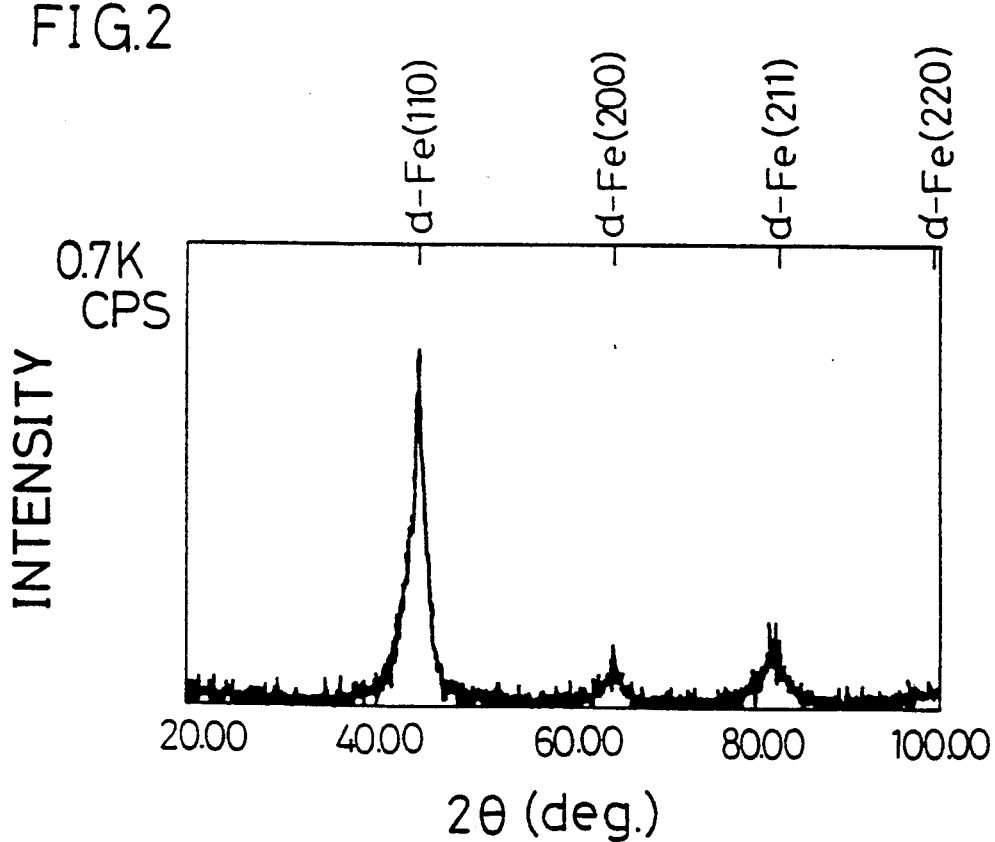
FIG. 2 is a X-ray diffraction spectra for iron-nitride powder which contains 10 at % of nitrogen.

FIG. 2 shows X-ray diffraction pattern of a resulting powder sample in which the above-mentioned treatment was performed 8 times. As compared with pure iron, the structure of the resulting powder is identified as bcc, and the diffraction lines shifted to a small angle side. These data show that nitrogen atoms have dissolved in $\alpha$-Fe and expand its lattice.

Figure 3:
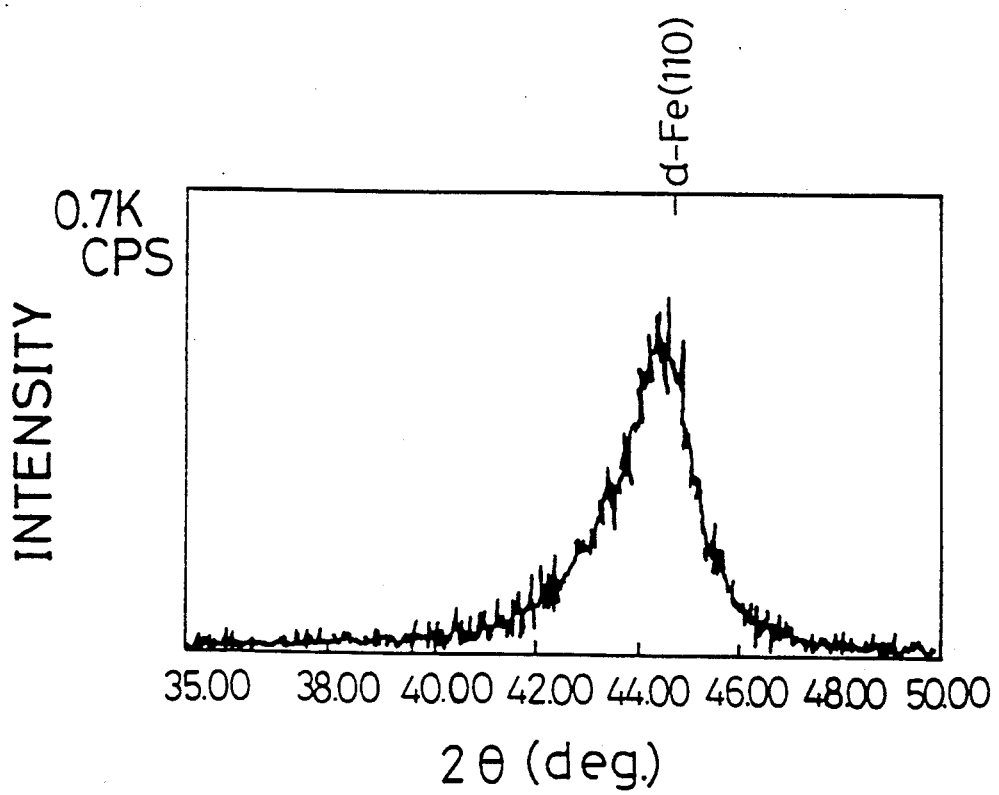
FIG. 3 is a partial enlarged view of FIG. 2.

FIG. 3 shows an enlarged view of the above x-ray diffraction pattern of Fe(110).

The average amount of nitrogen of iron-nitride powder at this stage is about 10 at %. As nitrogen is hardly dissolved into $\alpha$-Fe at room temperature, it is considered that nitrogen atoms are super-saturated within the iron of bcc crystal structure.

Figure 4:
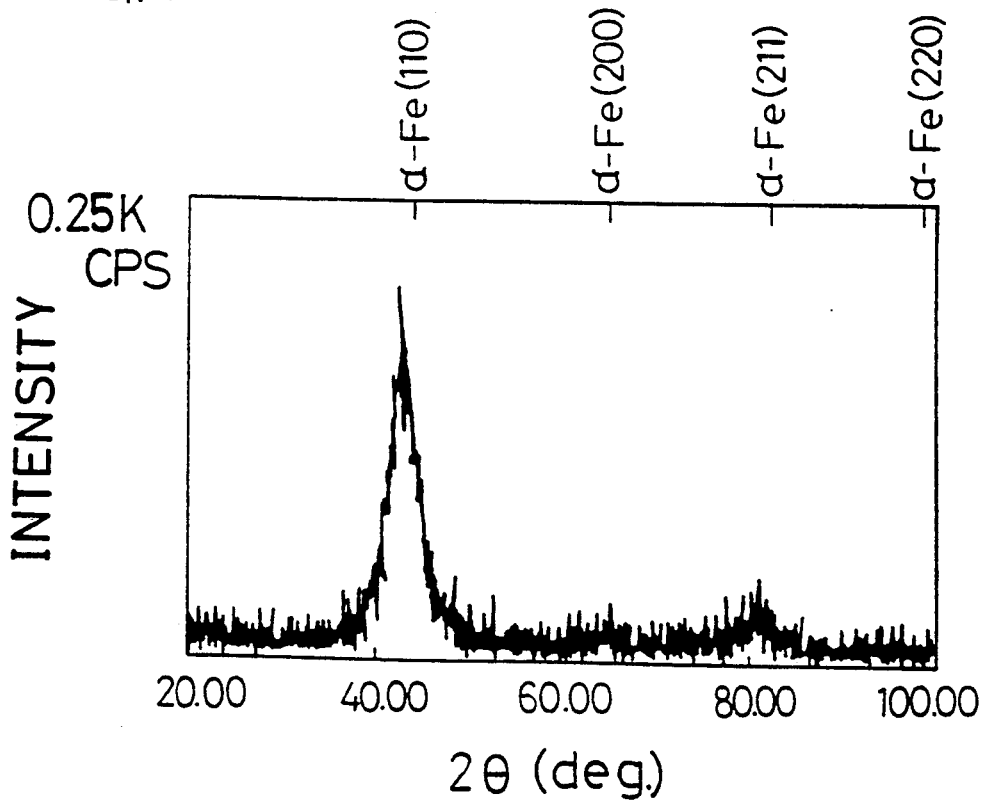
FIG. 4 is a X-ray diffraction spectra for iron-nitride powder which contains 14.9 at % of nitrogen.

FIG. 4 shows X-ray diffraction pattern of an iron-nitride powder sample which includes 14.9 at % of nitrogen. As compared with pure iron, the structure of the iron-nitride powder is bcc, and the diffraction line shifted to a small angle side. These data show that nitrogen is dissolved in $\alpha$-Fe and the lattice constant of $\alpha$-Fe becomes large.

The iron-nitride powder which included 1.4.9 at % of nitrogen was annealed at 250° C. for 24 hours. This annealing decomposed the iron-nitride into $\alpha$-Fe and $\gamma'$-Fe$_4$N, which were stable phases as described in Fe-N phase diagram shown in FIG. 16.

Figure 5:
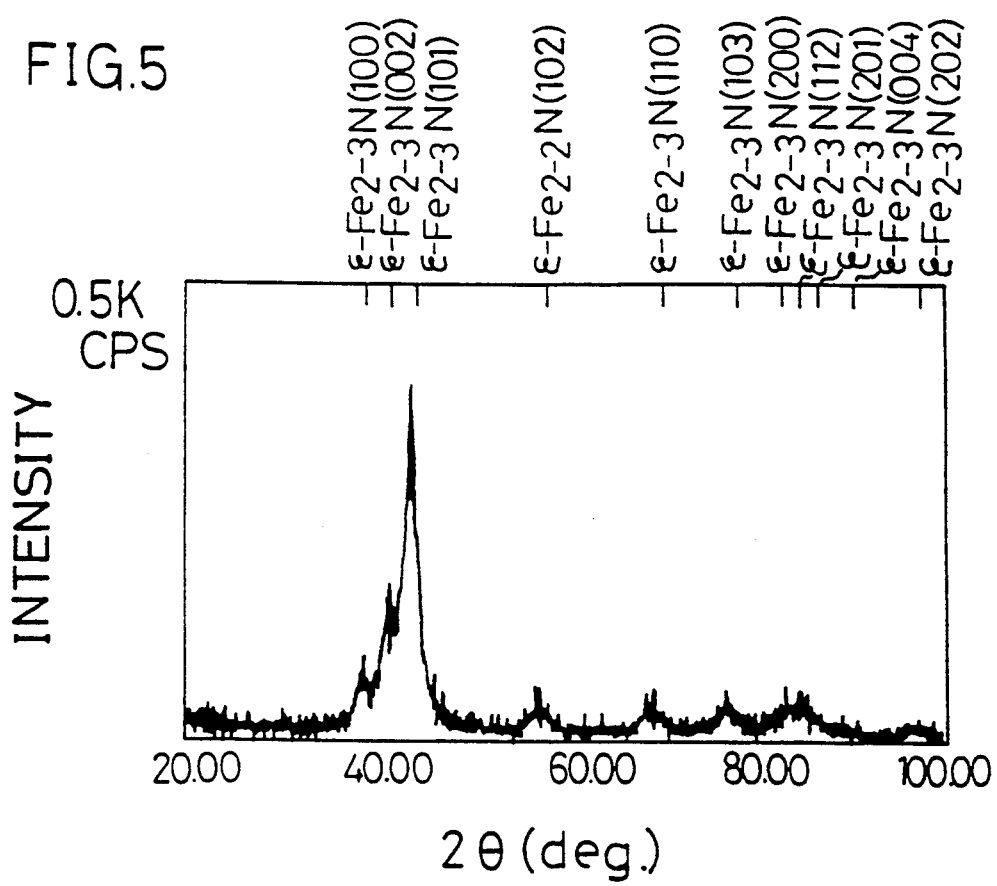
FIG. 5 is a X-ray diffraction spectra for iron-nitride powder which contains 22 at % of nitrogen.

FIG. 5 shows X-ray diffraction pattern of an iron-nitride powder in which milling treatment was performed 20 times. The average amount of nitrogen in this sample was about 22 at %.

$\gamma'$-Fe$_4$N is a stable phase at this composition as shown in Fe-N phase diagram, but the $\epsilon$-phase is produced.

Figure 6:
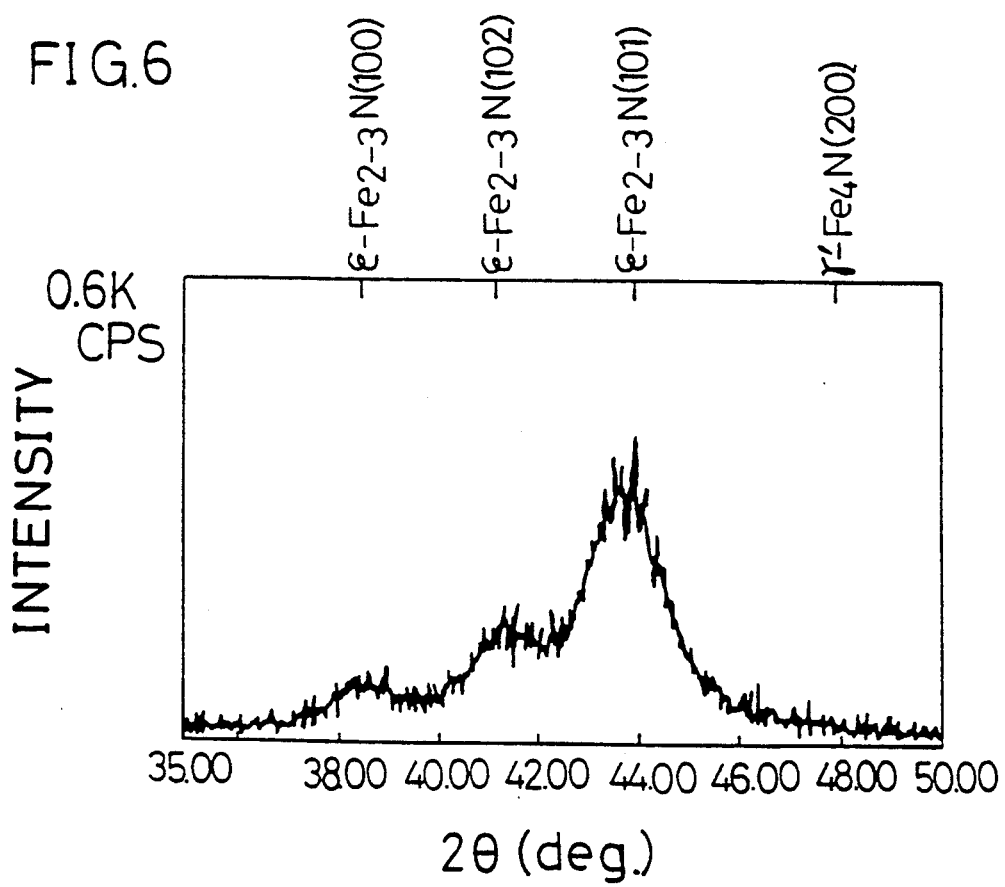
FIG. 6 is a partial enlarged view of FIG. 5.

FIG. 6 shows an enlarged view of the above X-ray diffraction pattern of the area around $2\theta = 42°$ C. Each position of three diffraction lines almost corresponds to that or $\epsilon$-Fe$_{2-3}$N (100) (002), (101), respectively.

Figure 7:
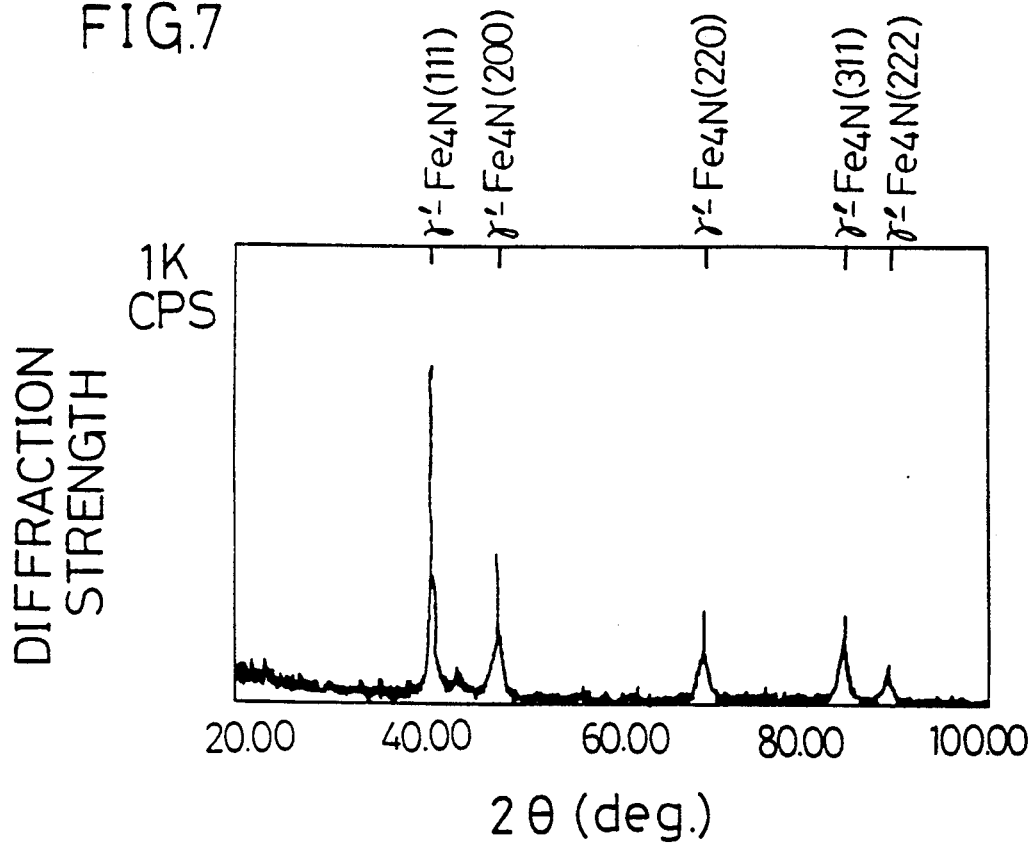
FIG. 7 is a X-ray diffraction pattern for the sample of 22 at % of nitrogen after annealing at 250° C.
Figure 8:
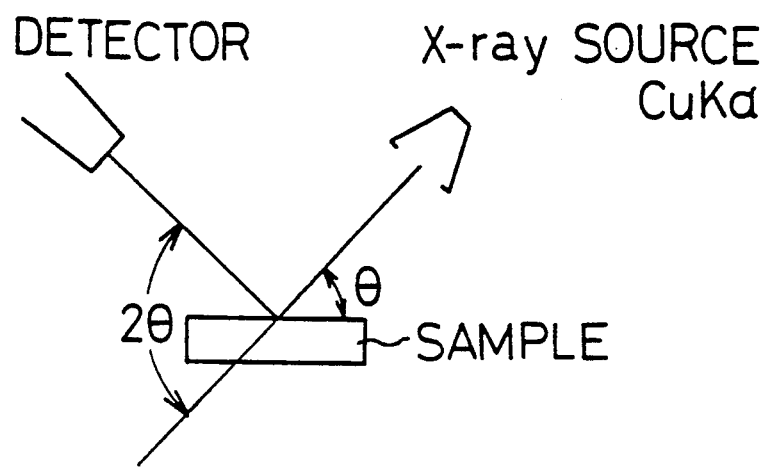
FIG. 8 is a diagram of 2 in FIG. 1 through FIG. 7.

The iron-nitride powder including 22 at % of nitrogen was annealed at 400° C. for 24 hours. This annealing changed the sample into $\gamma'$-Fe$_4$N and a small amount of unreacted material as shown in FIG. 7.

The milling treatment was performed several times. This is why enough amount of NH$_3$ gas necessary to react cannot be supplied into the vessel because the volume of the vessel is small. If NH$_3$ gas is supplied continuously into the vessel, it is unnecessary to perform the milling treatment several times.

In the First Preferred Embodiment, the balls made of bearing steel and the ball mill vessel made of die steel were used. In case that balls and a ball mill vessel, both of which; were made of iron, were used, it was confirmed that the same reaction between iron powder and ammonia as described in the First Preferred Embodiment occurred.

Figure 10:
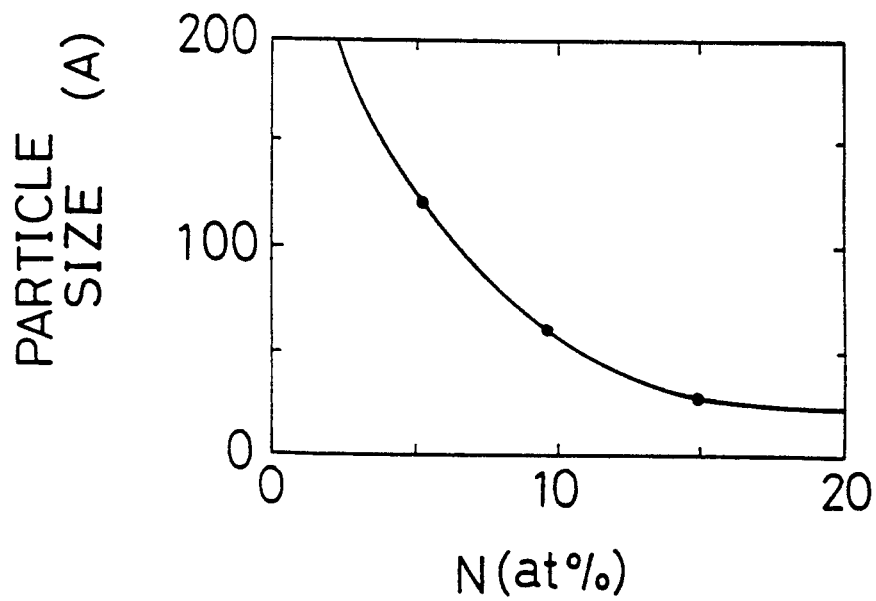
FIG. 10 shows a relation of nitrogen content and particle size.

FIG. 10 shows the size of crystallite measured by Hall Plot on the basis of the line width of X-ray diffraction profile. It is clear that the amount of nitrogen increases and the diameter becomes small.

Figure 11:
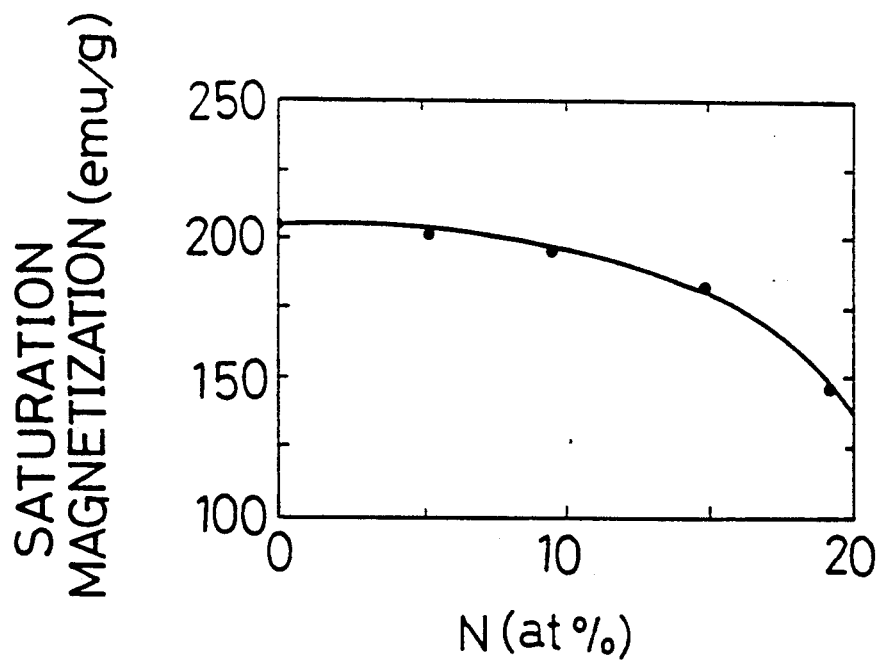
FIG. 11 shows a relation of nitrogen content and saturation magnetization.

FIG. 11 shows the amount of nitrogen and saturation magnetization. When the amount of nitrogen is increased to 19.6%, magnetization becomes small because $\epsilon$ phase is generated.

Figure 12:
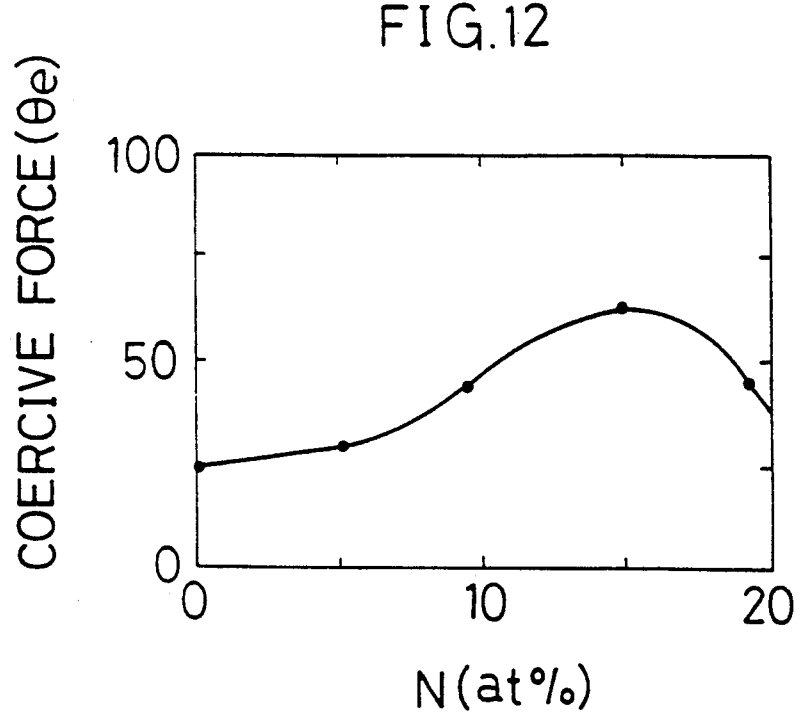
FIG. 12 shows a relation of nitrogen content and coercive force.

FIG. 12 shows the relationship between the amount of nitrogen and coercive force. As the absorption of nitrogen is progressing, coercive force is increasing. When the amount of nitrogen is almost 15 at %, coercive force becomes 2.6 times larger than that of $\alpha$-Fe. When nitriding further progresses and phase is generated, coercive force decreases. As known from the result, the iron-nitride in which the amount of nitrogen is 14.9 at % is suitable for hard magnetic material.

When the amount of nitrogen is less than 5 at %, coercive force is almost same as that of pure iron. When the amount of nitrogen exceeds 20 at %, $\epsilon$ phase is generated. So, this unsuitable for magnetic material with high coercive force as described in the present invention.

When the amount of nitrogen which is dissolved into iron is larger than 0.4 at %, saturation magnetization is not deteriorated. When the amount of nitrogen which is dissolved into iron is more than 20%, the saturation magnetization decreases to half of that of pure iron. So, this is unsuitable for an application as magnetic material.

Second Preferred Embodiment

In the Second Preferred Embodiment, a planetary type ball mill (Flitsch P-5) was used. Twenty balls made of bearing steel having a diameter of 10 mm was used. A mixture of $Fe_4N$ powder having fcc structure (smaller than 200 mesh) and pure iron powder (smaller than 200 mesh) was used. The averaged nitrogen concentration is 11 at %. The mixed powder was filled within the ball mill vessel (the volume is 80 cc) made of die steel. Then, argon gas at a pressure of 0.8 kg/cm$_2$ was supplied into the vessel. The ball mill vessel was rotated at 440 rpm.

$\gamma'$-$Fe_4N$ powder possesses the perovskite structure and is generated by nitrizing Fe.

Figure 13:
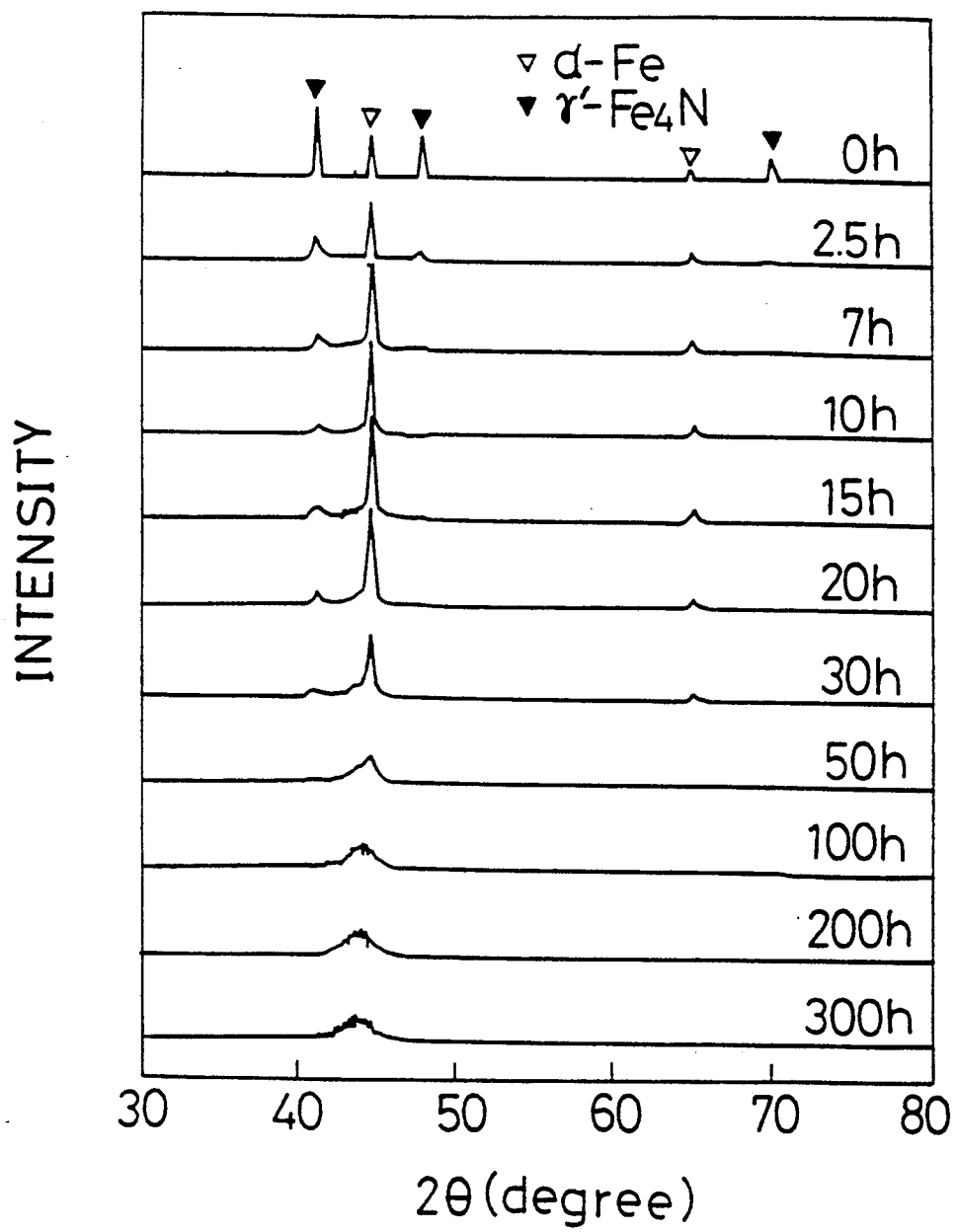
FIG. 13 shows X-ray diffraction patterns of the product which were produced from powders of $\gamma'$-Fe$_4$N and pure iron.

FIG. 13 shows X-ray diffraction spectra for Fe-$Fe_4N$ powders milled for various milling time. At 0 hour in the X-ray diffraction chart, peaks of Fe of $\alpha$ phase having bcc structure ($\alpha$-Fe in FIG. 13) and $Fe_4N$ of $\gamma'$ phase ($\gamma'$-$Fe_4N$ in FIG. 13) are clearly observed. As it takes more time for ball-milling, (for example, 2.5 hours, 7 hours, 10 hours, . . . 200 hours, 300 hours), the peaks of $\gamma'$ phase disappear. Only the peaks associated with bog structure remains. The peak of Fe shifted to a low angle side, and lattices of bcc structure are expanded since N atomic is introduced into the bcc matrix.

Figure 14:
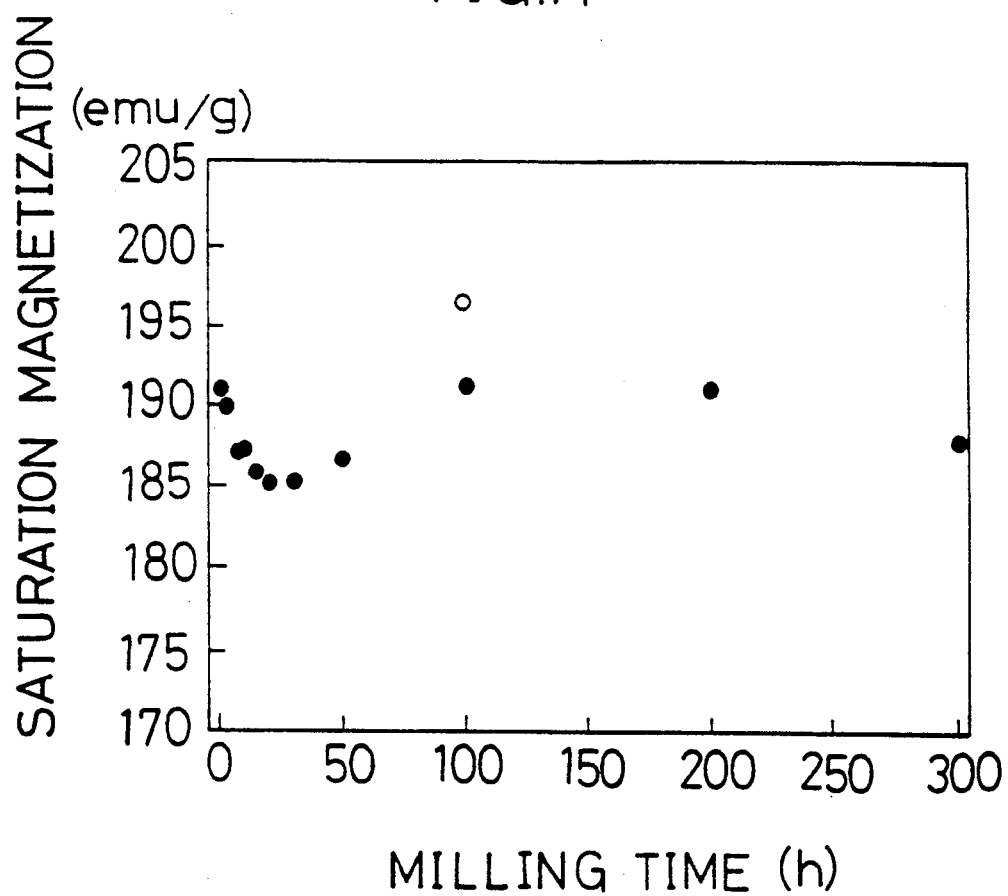
FIG. 14 is a view for representing the change of saturation magnetization of iron-nitride powder in regard to milling time.
Figure 15:
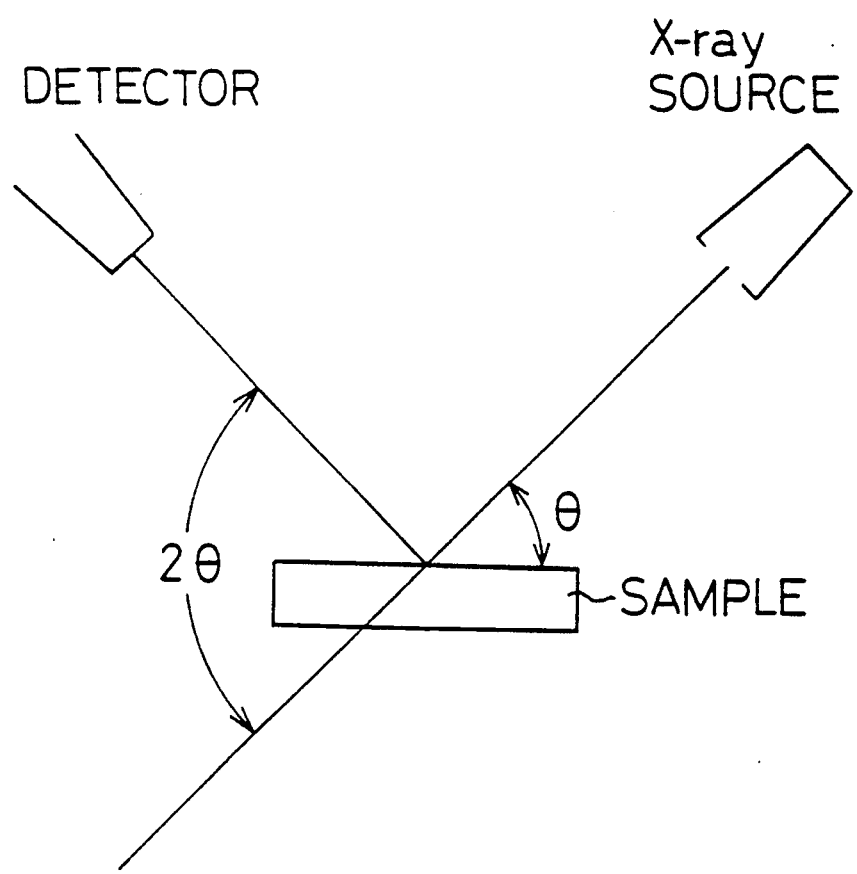
FIG. 15 is a view for representing the geometry of X-ray diffraction experiment.
Figure 16:
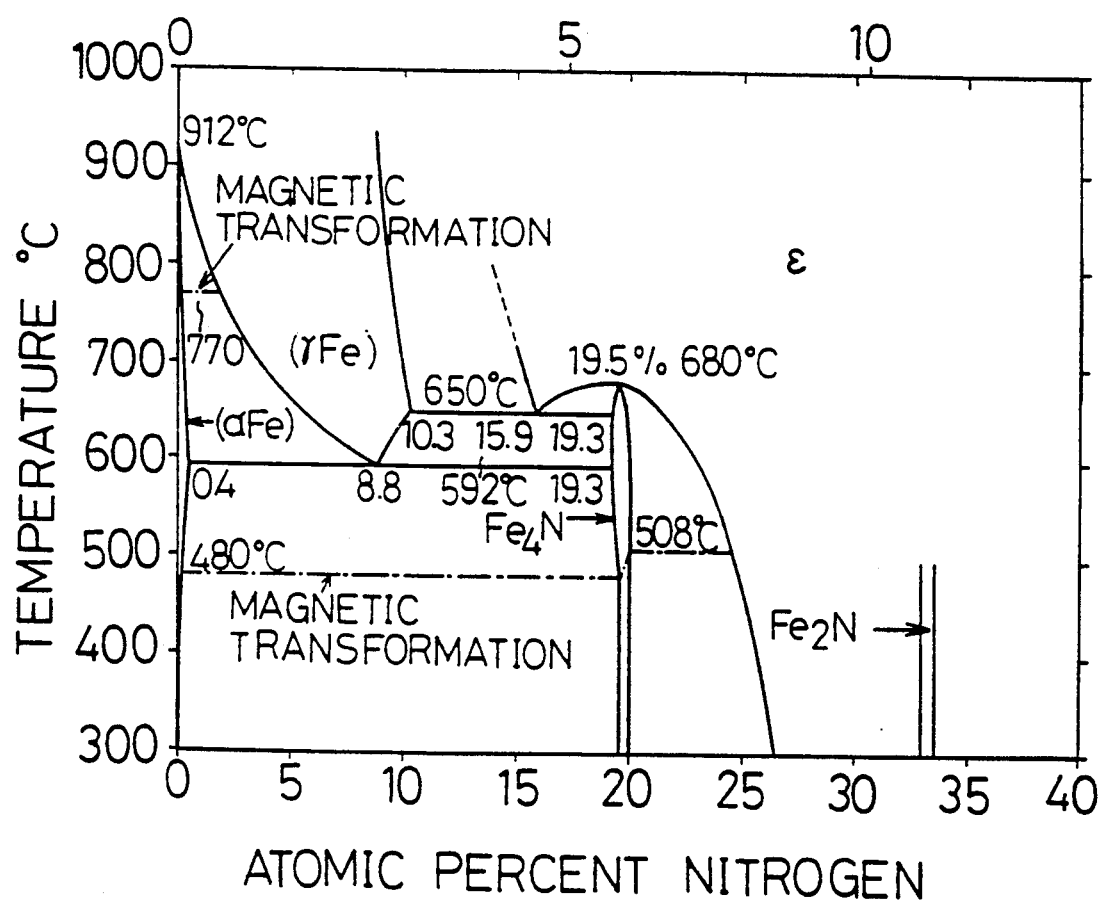
FIG. 16 is a Fe-N phase diagram.

FIG. 14 shows the saturation magnetization of the powders obtained by ball-milling $Fe_4N$ powder and Fe powder. As it takes more time for mixing Fern and Fe in the ball mill, the saturation magnetization decreases from 191 emu/g to 85 emu/g. After the mixed substance has been kneaded for 100 hours, the saturation magnetization restores to 191 emu/g and never decreases.

Saturation magnetization is measured by means of sampling (shown as black circle in FIG. 14) which is performed 8 times during 100 hours. Though the sampling is performed in a glove box filled with Ar gas, this causes slight oxidation due to residual oxygen in the glove box.

The magnetization of a sample milled for 100 hours without sampling is shown as white circle in FIG. 14. The saturation magnetization of this sample is 197 emu/g. Therefore, it is concluded that the powder thus produced possess larger magnetization than the starting powders.

What is claimed:

1. A method for producing iron-nitride powder, comprising the steps of:

introducing iron powder and an $NH_3$ gas or $N_2$ gas atmosphere into a vessel; and milling said iron power in said $NH_3$ gas or said $N_2$ gas atmosphere at a temperature less than 160° C.

2. The method of claim 1, wherein the atmosphere in said vessel is a $N_2$ gas atmosphere further containing hydrogen gas.

3. A method for producing iron-nitride power, comprising the steps of:

introducing iron powder and an intermetallic compound powder of iron and nitrogen into a vessel; and milling said iron powder and said intermetallic compound powder under an inert gas atmosphere or an ammonia gas or nitrogen atmosphere or a mixed gas atmosphere of $N_2$ and $H_2$ at a temperature less than 160° C.

4. The method of claim 3, wherein said intermetallic compound is $Fe_4N$.

5. The method of claim 3, wherein said intermetallic compound is $Fe_2N$.

6. The method of claim 3, wherein the atmosphere in said vessel is an inert gas atmosphere.

7. The method of claim 3, wherein the atmosphere in said vessel is ammonia or nitrogen.

* * * * *